US006333061B1

(12) United States Patent
Vadhar

(10) Patent No.: US 6,333,061 B1
(45) Date of Patent: **\*Dec. 25, 2001**

(54) PACKAGING ARTICLE

(75) Inventor: Parimal M. Vadhar, Greer, SC (US)

(73) Assignee: Cryovac, Inc., Duncan, SC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/970,187

(22) Filed: Nov. 14, 1997

Related U.S. Application Data

(60) Provisional application No. 60/031,674, filed on Nov. 22, 1996.

(51) Int. Cl.$^7$ ............................. B32B 27/30; B32B 27/32; B65B 53/02
(52) U.S. Cl. ........................... 426/127; 206/497; 426/130; 426/415; 428/34.9; 428/35.4; 428/36.6; 428/36.7; 428/475.8; 428/476.9; 428/483; 428/515; 428/516; 428/518; 428/520
(58) Field of Search .................................. 428/34.9, 35.2, 428/35.4, 35.7, 36.6, 36.7, 475.8, 476.9, 483, 515, 516, 518, 520; 206/497; 426/127, 130, 415

(56) References Cited

U.S. PATENT DOCUMENTS

| | | | |
|---|---|---|---|
| 4,064,296 | 12/1977 | Bornstein et al. | 428/35 |
| 4,278,738 | * 7/1981 | Brax et al. | 428/515 |
| 4,302,565 | 11/1981 | Goeke et al. | 526/88 |
| 4,302,566 | 11/1981 | Karol et al. | 526/125 |
| 4,965,135 | * 10/1990 | Im et al. | 428/412 |
| 5,206,075 | 4/1993 | Hodgson, Jr. | 428/216 |
| 5,234,731 | 8/1993 | Ferguson | 428/34.9 |
| 5,241,031 | 8/1993 | Mehta | 526/348.1 |
| 5,272,236 | 12/1993 | Lai et al. | 526/348.5 |
| 5,278,272 | 1/1994 | Lai et al. | 526/348.5 |
| 5,298,326 | 3/1994 | Norpoth et al. | 428/349 |
| 5,374,459 | 12/1994 | Mumpower et al. | 428/36.7 |
| 5,565,160 | 10/1996 | Makuuchi | 264/485 |
| 5,759,648 | * 6/1998 | Idlas | 428/34.9 |
| 5,834,077 | * 11/1998 | Babrowicz | 428/34.9 |
| 5,846,620 | 12/1998 | Compton | 428/35.7 |

FOREIGN PATENT DOCUMENTS

| | | | |
|---|---|---|---|
| 0 369 447 A2 | 11/1989 | (EP) | B32B/27/00 |
| 0 487 268 | 5/1992 | (EP) . | |
| 0 519 251 A2 | 5/1992 | (EP) | B32B/7/00 |
| 0 665 102 | 8/1995 | (EP) . | |
| 0 673 759 | 9/1995 | (EP) . | |
| 0 686 497 | 12/1995 | (EP) . | |
| 0 802 046 | 10/1997 | (EP) | B32B/27/32 |
| WO 90/03414 | 4/1990 | (WO) | C08L/23/08 |
| WO 93/03093 | 12/1995 | (WO) | C08L/23/04 |
| WO 95/33621 | 12/1995 | (WO) . | |

OTHER PUBLICATIONS

ASTM 1938–94, "Standard Test Method for Tear–Propagation Resistance ofPlastic film and Thin Sheeting by a Single–Tear Method", pp. 483–485, 1994.

ASTM 2732–83, "Standard Test Method for Unrestrained Linear Thermal Shrinkage of Plastic Film and Sheeting", pp. 368–371, 1983.

Wild et al., "Determination of Branching Distributions in Polyethylene and Ethylene Copolymers", pp. 441–455, vol. 20, 1982.

* cited by examiner

*Primary Examiner*—Harold Pyon
*Assistant Examiner*—Sandra M. Nolan
(74) *Attorney, Agent, or Firm*—Rupert B. Hurley, Jr.

(57) ABSTRACT

A sealed article comprising a multilayer film having at least 4 layers. The first layer is an inside layer comprising ethylene/alpha-olefin copolymer and/or polystyrene. The second layer comprises ethylene/unsaturated ester copolymer, anhydride-modified ethylene/alpha-olefin copolymer, anhydride-modified ethylene/ester copolymer, acid-modified ethylene/alpha-olefin copolymer, and/or acid-modified ethylene/acid copolymer. The third layer comprises ethylene/alpha-olefin copolymer and/or polystyrene. The fourth layer comprises ethylene homopolymer, ethylene/alpha-olefin copolymer, ethylene/vinyl alcohol copolymer, polyvinylidene chloride, polyamide, polyester, polyalkylene carbonate, polyacrylonitrile, and/or ethylene/unsaturated ester copolymer. At least 85 volume percent of the film is made up of polyolefin homopolymer, polyolefin copolymer, ethylene/ester copolymer, polystyrene, styrene/butadiene copolymer, EVOH, PVDC, and polyacrylonitirile. The film has a total thickness of at least 2 mils, and an impact strength of at least about 1.5 ft-lbs. The article comprises a seal of the film to itself and/or another film. In another article, in which the film has at least 6 layers, the film has a thickness of at least 2 mils and a tear propagation of at least 300 grams.

29 Claims, 5 Drawing Sheets

PACKAGING ARTICLE

CROSS-REFERENCE TO RELATED APPLICATION

This application claims priority from copending provisional application Ser. No. 60/031,674, filed Nov. 22, 1996, in the name of Parimal M. Vadhar, entitled "Packaging Article."

FIELD OF THE INVENTION

The present invention relates to an article comprising a multilayer film suitable for packaging end use, especially a multilayer film suitable for use in the packaging of relatively hard, granular bulk products, such as dry pet food. The article comprises a heat seal of the film to itself or another film, preferably, in the form of a gusseted bag. The present invention also relates to packaged products in which the package comprises the article of the invention.

BACKGROUND OF THE INVENTION

For some time various products have been packaged in packages which comprise paper alone or paper in combination with a thermoplastic film. Such packaging has typically included a plurality of paper layers, with a relatively thin, flexible plastic film adhered to the inside paper layer, the film serving as a moisture and grease barrier. The paper provides the package with an exterior surface which is highly printable, as well as a stiffness which provides the packaging article, which is, for example, a gusseted bag, with an ability to be self-supporting and to provide the package with overall aesthetic qualities which consumers perceive as being desirable. Such paper packaging has been used in a variety of applications, particularly gusseted bags which are used in the packaging of dry granular material such as pet food, livestock feed, sugar, coffee, cookies, cereals, baking products such as cake mixes, crackers, chips, powdered milk, charcoal, cement, fertilizer, lime, pesticides, etc. The packaging can also be used to package cheese, in grated, ground, and/or block form.

More recently, paper-free plastic film packaging materials have been used for the packaging of a such products as pet food, etc. In order to obtain a desirable performance level, i.e., in terms of impact strength and toughness, such packaging films have contained relatively large quantities of polymers which are recognized for their toughness and impact resistance, such as polyamide, polyester, and polyacrylonitrile. However, these polymers are also relatively expensive. It would be desirable if a comparably tough, impact-resistant package could be made from less expensive polymers. Moreover, it would also be desirable to provide packaging which provides a high $O_2$-barrier layer to increase the shelf-life of the product. In addition, in such plastic packaging, particularly in the packaging of hard, granular bulk products such as dry pet food, it has been found that "dimples" tend to form in the plastic, thereby creating a rough, dimpled appearance in the outside of the package. It would be desirable to provide packaging which avoids this "dimpling" effect. Finally, it would be desirable to provide such packaging which is also relatively stiff, e.g., capable of providing a self-supporting gusseted bag.

In the case of the packaging of food in paper packaging, particularly pet food, it has heretofore been desirable to mix antioxidant into the food product; otherwise the food tends to lose metabolizable energy, exhibit decreased acceptability, including undesirable odors and flavors, protein degradation, and the development of health hazards in the consuming animal. Thus, without antioxidant present, food packaged in paper packaging exhibits reduced shelf-life and/or reduced product quality. It would be desirable to provide a type of packaging which requires less antioxidant, or even no antioxidant, to be mixed with a food product within the package, without the detrimental effects associated with the oxidation of the food product. In this manner, the expense of providing the antioxidant as well as the mixing of the antioxidant with the food product, are both reduced or avoided, while maintaining a good shelf life for the packaged food product.

SUMMARY OF THE INVENTION

The present invention is directed to an article which is suitable for packaging end-use and which comprises a multilayer film. The majority of the multilayer film is made from relatively inexpensive polymers. Nevertheless, it has been found that the multilayer film can be provided with toughness and impact resistance characteristics which are adequate for the packaging of various product, including dry pet food. Moreover, it has been found that the multilayer film can be provided with toughness and impact resistance characteristics which are comparable to, or even superior to, plastic packaging materials which comprising higher amounts of more expensive polymers such as nylon, polyester, and polyacrylonitrile.

In addition, the multilayer film in the article of the present invention can be provided with an $O_2$-barrier layer which increases the shelf life of, for example, a packaged food product therein. The presence of the $O_2$-barrier layer reduces or eliminates the need to add antioxidants, etc. to a food product, such as pet food, to prevent the oxidative rancidity, off-flavors, and off-odors of the packaged food product. The multilayer film also can be provided with a stiffness which, if the multilayer film is converted to a gusseted bag which is self-supporting. The multilayer film can also be provided with: (a) high gloss, to provide a packaged product having enhanced aesthetic appeal; (b) high resistance to tear propagation; (c) printing on the surface of the film, and/or printing which is trapped between the layers of the film; and (d) high impact strength.

As a first aspect, the present invention is directed to a sealed article comprising a multilayer film. The multilayer film comprises at least 4 layers. The first film layer which is an inside film layer comprising at least one member selected from the group consisting of ethylene/alpha-olefin copolymer and polystyrene; the second film layer comprises at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, acid-modified ethylene/acid copolymer; the third film layer comprising at least one member selected from the group consisting of ethylene/alpha-olefin copolymer and polystyrene; the fourth film layer which is an outside layer comprising at least one member selected from the group consisting of ethylene homopolymer, ethylene/alpha-olefin copolymer, ethylene/vinyl alcohol copolymer, polyvinylidene chloride, polyamide, polyester, polyalkylene carbonate, polyacrylonitrile, and ethylene/unsaturated ester copolymer. At least 85 percent of the film, based on total film volume, is made of (i.e., consists of) at least on member selected from the group consisting of polyolefin homopolymer, polyolefin copolymer, ethylene/ester copolymer, polystyrene, styrene/butadiene copolymer, EVOH, PVDC, and polyacrylonitirile. This composition is preferably from about 85–100 volume percent; more preferably, from about 87 to 100; still more preferably 89–100; yet still more preferably, from about 90–100; even yet still more preferably, from about 92–100; and even still more preferably, from about 95–100 volume percent. In addition, the film has a total thickness of at least 2 mils, and an impact strength of at least about 1.5 ft-lbs (preferably, at least 1.6 ft-lbs; more preferably, at least 1.7 ft-lbs). The article comprises a heat seal of the film to at least one member selected from the group consisting of itself and another film.

Preferably, the film has an impact strength of from about 1.5–20 fl-lb; more preferably, from about 2–5 ft-lb. Preferably, the film has a ball burst impact strength of from about 10 to 70 cm-kg, more preferably from about 20 to 60 cm-kg; still more preferably, from about 30 to 50 cm-kg.

Preferably, the first and third film layers further comprise ethylene/unsaturated ester copolymer. Preferably, the seal is a heat seal. Preferably, the article comprises a heat seal of the film to itself.

Preferably, the first film layer is directly adhered to the second film layer; the third layer is directly adhered to the second layer; the third layer is between the second layer and the fourth layer. Preferably, the film further comprises an adhesive between the third film layer and the fourth film layer. Preferably, the article comprises a heat seal of the first film layer to itself.

Preferably, the first film layer comprises oriented polymer, the second film layer comprises oriented polymer, and the third film layer comprises oriented polymer. Preferably, the multilayer film has a tensile strength at break of at least 4000 psi.; more preferably, from about 4000 to 50,000 psi; still more preferably, from about 4500 to 35,000 psi; yet still more preferably, from about 5,000 to 25,000 psi.; even yet still more preferably, from about 4,000 to 14,000 psi.

Preferably, the film is biaxially oriented to a total orientation (i.e., L+T) in an amount of from about 50 to 500 percent at a temperature of from about 180 to 300° F.; more preferably, the fourth layer comprises oriented polymer, and each of the oriented polymers is biaxially oriented to a total orientation of from about 200 to 500% at a temperature of from about 200 to 280° F.; still more preferably, each of the oriented polymers is biaxially oriented to a total orientation of from about 150 to 250 percent, at a temperature of from about 210 to 270° F.

Preferably, the article comprises a crosslinked polymer network. Preferably, the crosslinked polymer network is produced by irradiation, preferably irradiation at a level of from about 0.5 to 15 MR (i.e., 5 to 150 kGy); more preferably, from about 1 to 8 MR (i.e., 10–80 kGy); still more preferably, from about 3 to 5 MR (i.e., 30–50 kGy).

Preferably, the film has a tear propagation of from about 50 to 800 grams; more preferably, from about 60 to 700 grams; still more preferably, from about 100 to 600 grams.

Preferably, the fourth layer comprises at least one member selected from the group consisting of ethylene/alpha-olefin copolymer and ethylene/unsaturated ester copolymer, and the film further comprises a fifth film layer which serves as an $O_2$-barrier layer, the fifth layer being between the third layer and the fourth layer, the fifth film layer comprising at least one member selected from the group consisting of PVDC, EVOH, polyalkylene carbonate, polyacrylonitrile, polyamide, and polyester. Still more preferably, the film further comprises: (a) a sixth layer which is between the fourth layer and the fifth layer, the sixth layer serving as a first tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, acid-modified ethylene/acid copolymer; and (b) a seventh layer, which is between the third layer and the fifth layer, the seventh layer serving as a second tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, acid-modified ethylene/acid copolymer. Still more preferably, the film further comprises an eighth layer which is between the third layer and the seventh layer, the eighth layer comprising at least one member selected from the group consisting of ethylene/alpha-olefin copolymer and ethylene/unsaturated ester copolymer. Still more preferably, the film further comprises a ninth layer which comprises a laminating adhesive. Preferably, the laminating adhesive comprises a urethane-based adhesive. Preferably, the fourth layer comprises high density polyethylene. Preferably, the film has an outside surface which has a gloss of at least 60 percent; preferably, from about 60 to 100 percent; more preferably, from about 80 to 90 percent.

Preferably, at least one member selected from the group consisting of the first layer and the second layer comprise polystyrene, and wherein the multilayer film has a modulus of at least about 20,000 psi.; more preferably, from about 25,000 to 300,000 psi; still more preferably, from about 30,000 to 200,000 psi.

Preferably, the multilayer film has a tear propagation of from about 10 to 500 grams per mil; more preferably, from about 15 to 200 grams per mil.

At least one film layer can comprise pigment. The article can also have trap printing is between the third layer and the fourth layer. Alternatively, printing can be present on an outside surface of the second outer layer.

Preferably, the article comprises a bag. Although the bag is preferably a gusseted bag, which can have side gussets or a bottom gusset, the bag can also be a non-gusseted end-seal bag or a non-gusseted side seal bag.

The multilayer film can be heat-shrinkable. If heat-shrinkable, the multilayer film preferably has a total free shrink (i.e., L+T), of from about 2 to 100 percent, at 180° F.; more preferably, a total free shrink of from about 15 to 50 percent at 180° F.

As a second aspect, the present invention pertains to a packaged product. The package comprises the article in accordance with the present invention, preferably a preferred article according to the present invention. The article serves as a package which surrounds a packaged product which comprises hard, flowable, particulates, and/or a non-flowable product comprising cheese. Preferably, the hard, flowable particulates comprise food. Preferably, the food product comprises at least one member selected from the group consisting of pet food, livestock feed, sugar, coffee, cookies, cereal, cake mix, crackers, chips, powdered milk, and plant food. Other hard, flowable products include charcoal, cement, fertilizer, lime, pesticide, and herbicide.

As a third aspect, the present invention pertains to a sealed article comprising a multilayer film comprising at least 6 layers. The first film layer is an inside film layer comprising at least one member selected from the group consisting of ethylene/alpha-olefin copolymer and polystyrene; the second film layer serves as tie layer, and comprises at least one member selected from the group consisting of ethylene/ unsaturated ester copolymer, anhydride-modified ethylene/ alpha-olefin copolymer, anhydride-modified ethylene/ester copolymer, acid-modified ethylene/alpha-olefin copolymer, acid-modified ethylene/acid copolymer; the third film layer comprising at least one member selected from the group consisting of polyvinylidene chloride, ethylene/vinyl alcohol copolymer, polyalkylene carbonate, and polyacrylonitrile; the fourth film layer which serves as tie layer, and which comprises at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, acid-modified ethylene/acid copolymer; the fifth film layer comprises at least one member selected from the group consisting of ethylene/alpha-olefin copolymer and polystyrene; the sixth film layer comprises at least one member selected from the group consisting of high density ethylene homopolymer, ethylene/alpha-olefin copolymer, polystyrene, styrene/butadiene copolymer, polystyrene, propylene. At least 85 percent of the film, based on total film volume, is made of (i.e., consists of) at least on member selected from the group consisting of polyolefin homopolymer, polyolefin copolymer, ethylene/ester copolymer, polystyrene, styrene/butadiene copolymer, EVOH, PVDC, and polyacrylonitirile. more preferably, from about 87 to 100 percent; still more preferably 89–100 percent; yet still more preferably, from about 90–100 percent; even yet still more preferably, from about 92–100 percent; and even still more preferably, from about 95–100 percent. The film has a total thickness of at least 2 mils, and a tear propagation of at least 300 grams. The article comprises a heat seal of the film to at least one member selected from the group consisting of itself and another film. Preferably, the multilayer film has a tear propagation of from about 300 to 800 grams; more preferably, from about 350 to 700 grams; still more preferably, from about 400 to 600 grams; and, yet still more preferably, from about 500 to 600 grams. Preferably, the multilayer film has a modulus of at least about 30,000 psi.; more preferably, from about 30,000 to 250,000 grams.

DETAILED DESCRIPTION OF THE INVENTION

Figure 1:
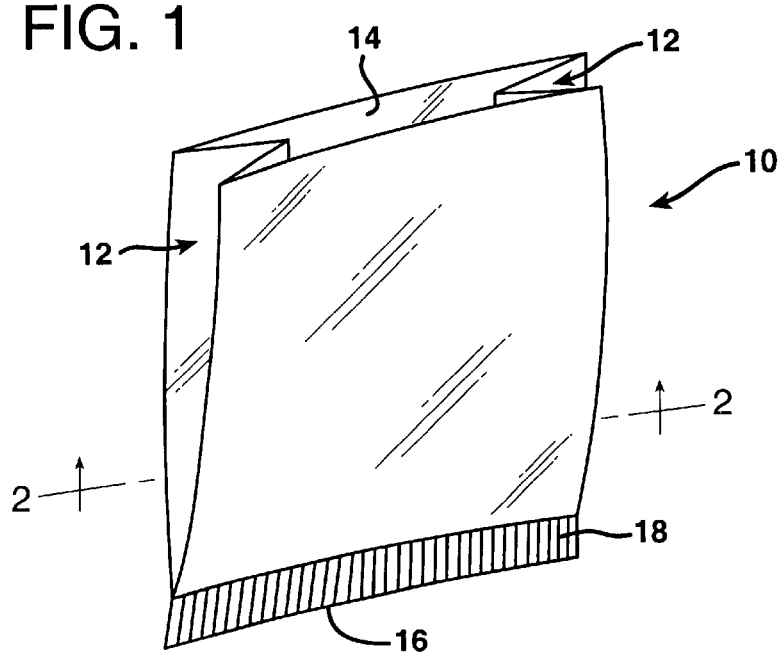
FIG. 1 illustrates a perspective view of a side-gusseted bag in accordance with the present invention.

As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product which is surrounded by a packaging material.

As used herein, the term "seal" refers to any seal of a first region of an outer film surface to a second region of an outer film surface, wherein the seal is formed by heating the regions to at least their respective seal initiation temperatures. The sealing can be performed by any one or more of a wide variety of manners, such as using a heat seal technique (e.g., melt-bead sealing, thermal sealing, impulse sealing, dielectric sealing, radio frequency sealing, ultrasonic sealing, hot air, hot wire, infrared radiation, etc.).

As used herein, the term "barrier", and the phrase "barrier layer", as applied to films and/or film layers, are used with reference to the ability of a film or film layer to serve as a barrier to one or more gases. In the packaging art, oxygen (i.e., gaseous $O_2$) barrier layers have included, for example, hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyalkylene carbonate, polyacrylonitrile, etc., as known to those of skill in the art.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent; more preferably, from about 85 to 100 mole percent.

As used herein, the phrase "abuse layer", as well as the phrase "puncture-resistant layer", refer to an outer film layer and/or an inner film layer, so long as the film layer serves to resist abrasion, puncture, and other potential causes of reduction of package integrity, as well as potential causes of reduction of package appearance quality.

As used herein, the terms "lamination," "laminate," as well as the phrase "laminated film," refer to the process, and resulting product, made by bonding together two or more layers of film or other materials. Lamination can be accomplished by joining layers with adhesives, joining with heat and pressure, with corona treatment, and even spread coating and extrusion coating. Lamination is described in U.S. Pat. No. 5,374,459, to Mumpower et al. Lamination can be carried out by the application of polyurethane or other conventional lamination adhesive to either or both of the substrate films. Bonding is accomplished by techniques well known in the lamination art.

As used herein, the term "oriented" refers to a polymer-containing material which has been elongated (generally at an elevated temperature called the orientation temperature), followed by being "set" in the elongated configuration by cooling the material while substantially retaining the elongated dimensions. This combination of elongation at elevated temperature followed by cooling causes an alignment of the polymer chains to a more parallel configuration, thereby improving the mechanical properties of the film.

Upon subsequently heating unrestrained, unannealed, oriented polymer-containing material to its orientation temperature, heat shrinkage is produced almost to the original dimensions, i.e., pre-elongation dimensions. The term "oriented," is herein used with reference to oriented films, which can undergo orientation in any one or more of a variety of manners.

Orienting in one direction is referred to herein as "uniaxial orientation," while orienting in two directions is referred to herein as "biaxial orientation." As used herein, the phrase "total orientation" refers to the sum of the orientation in the longitudinal direction (machine direction) plus orientation in the transverse direction. In oriented plastic films, there can be internal stress remaining in the plastic sheet which can be relieved by reheating the film to a temperature above that at which it was oriented. Upon reheating such a film, the film tends to shrink back to the original dimensions it had before it was oriented. Films which shrink upon being heated are generally referred to as heat-shrinkable films.

As used herein, the phrase "orientation ratio" refers to the multiplication product of the extent to which the plastic film material is oriented in several directions, usually two directions perpendicular to one another. Orientation in the machine direction is herein referred to as "drawing", whereas orientation in the transverse direction is herein referred to as "stretching". For films extruded through an annular die, stretching is obtained by "blowing" the film to produce a bubble. For such films, drawing is obtained by passing the film through two sets of powered nip rolls, with the downstream set having a higher surface speed than the upstream set, with the resulting draw ratio being the surface speed of the downstream set of nip rolls divided by the surface speed of the upstream set of nip rolls. The degree of orientation is also referred to as the orientation ratio, also known as the "racking ratio".

As used herein, the term "monomer" refers to a relatively simple compound, usually containing carbon and of low molecular weight, which can react to form a polymer by combining with itself or with other similar molecules or compounds.

As used herein, the term "comonomer" refers to a monomer which is copolymerized with at least one different monomer in a copolymerization reaction, the result of which is a copolymer.

As used herein, the term "polymer" refers to the product of a polymerization reaction, and is inclusive of homopolymers, copolymers, terpolymers, tetrapolymers, etc. In general, the layers of a film can consist essentially of a single polymer, or can have additional polymers together therewith, i.e., blended therewith.

As used herein, the term "homopolymer" is used with reference to a polymer resulting from the polymerization of a single monomer, i.e., a polymer consisting essentially of a single type of repeating unit.

As used herein, the term "copolymer" refers to polymers formed by the polymerization reaction of at least two different monomers. For example, the term "copolymer" includes the copolymerization reaction product of ethylene and an alpha-olefin, such as 1-hexene. The term "copolymer" is also inclusive of, for example, the copolymerization of a mixture of ethylene, propylene, 1-hexene, and 1-octene. As used herein, the term "copolymerization" refers to the simultaneous polymerization of two or more monomers. The term "copolymer" is also inclusive of random copolymers, block copolymers, and graft copolymers.

As used herein, the term "polymerization" is inclusive of homopolymerizations, copolymerizations, terpolymerizations, etc., and includes all types of copolymerizations such as random, graft, block, etc. In general, the polymers, in the films used in accordance with the present invention, can be prepared in accordance with any suitable polymerization process, including slurry polymerization, gas phase polymerization, and high pressure polymerization processes.

As used herein, a copolymer identified in terms of a plurality of monomers, e.g., "propylene/ethylene copolymer", refers to a copolymer in which either monomer may copolymerize in a higher weight or molar percent than the other monomer or monomers. However, the first listed monomer preferably polymerizes in a higher weight percent than the second listed monomer, and, for copolymers which are terpolymers, quadripolymers, etc., preferably the first monomer copolymerizes in a higher weight percent than the second monomer, and the second monomer copolymerizes in a higher weight percent than the third monomer, etc.

As used herein, terminology employing a "/" with respect to the chemical identity of a copolymer (e.g., "an ethylene/alpha-olefin copolymer"), identifies the comonomers which are copolymerized to produce the copolymer. As used herein, "ethylene alpha-olefin copolymer" is the equivalent of "ethylene/alpha-olefin copolymer."

As used herein, copolymers are identified, i.e., named, in terms of the monomers from which the copolymers are produced. For example, the phrase "propylene/ethylene copolymer" refers to a copolymer produced by the copolymerization of both propylene and ethylene, with or without additional comonomer(s). As used herein, the phrase "mer" refers to a unit of a polymer, as derived from a monomer used in the polymerization reaction. For example, the phrase "alpha-olefin mer" refers to a unit in, for example, an ethylene/alpha-olefin copolymer, the polymerization unit being that "residue" which is derived from the alpha-olefin monomer after it reacts to become a portion of the polymer chain, i.e., that portion of the polymer contributed by an individual alpha-olefin monomer after it reacts to become a portion of the polymer chain.

As used herein, the phrase "heterogeneous polymer" refers to polymerization reaction products of relatively wide variation in molecular weight and relatively wide variation in composition distribution, i.e., polymers made, for example, using conventional Ziegler-Natta catalysts. Heterogeneous polymers are useful in various layers of the film used in the present invention. Such polymers typically contain a relatively wide variety of chain lengths and comonomer percentages.

As used herein, the phrase "heterogeneous catalyst" refers to a catalyst suitable for use in the polymerization of heterogeneous polymers, as defined above. Heterogeneous catalysts are comprised of several kinds of active sites which differ in Lewis acidity and steric environment. Ziegler-Natta catalysts are heterogeneous catalysts. Examples of Ziegler-Natta heterogeneous systems include metal halides activated by an organometallic co-catalyst, such as titanium chloride, optionally containing magnesium chloride, complexed to trialkyl aluminum and may be found in patents such as U.S. Pat. No. 4,302,565, to GOEKE, et. al., and U.S. Pat. No. 4,302,566, to KAROL, et. al., both of which are hereby incorporated, in their entireties, by reference thereto.

As used herein, the phrase "homogeneous polymer" refers to polymerization reaction products of relatively narrow molecular weight distribution and relatively narrow composition distribution. Homogeneous polymers can be used in various layers of multilayer films useful in the present invention. Homogeneous polymers are structurally different from heterogeneous polymers, in that homogeneous polymers exhibit a relatively even sequencing of comonomers within a chain, a mirroring of sequence distribution in all chains, and a similarity of length of all chains, i.e., a narrower molecular weight distribution. Furthermore, homogeneous polymers are typically prepared using metallocene, or other single-site type catalysis, rather than using Ziegler Natta catalysts.

More particularly, homogeneous ethylene/alpha-olefin copolymers may be characterized by one or more methods known to those of skill in the art, such as molecular weight distribution (Mw/Mn), composition distribution breadth index (CDBI), narrow melting point range, and single melt point behavior. The molecular weight distribution (Mw/Mn), also known as "polydispersity," may be determined by gel permeation chromatography. Homogeneous ethylene/alpha-olefin copolymers which can be used in the present invention preferably have an Mw/Mn of less than 2.7; more preferably from about 1.9 to 2.5; still more preferably, from about 1.9 to 2.3. The composition distribution breadth index (CDBI) of such homogeneous ethylene/alpha-olefin copolymers will generally be greater than about 70 percent. The CDBI is defined as the weight percent of the copolymer molecules having a comonomer content within 50 percent (i.e., plus or minus 50%) of the median total molar comonomer content. The CDBI of linear polyethylene, which does not contain a comonomer, is defined to be 100%. The Composition Distribution Breadth Index (CDBI) is determined via the technique of Temperature Rising Elution Fractionation (TREF). CDBI determination clearly distinguishes homogeneous copolymers (i.e., narrow composition distribution as assessed by CDBI values generally above 70%) from VLDPEs available commercially which generally have a broad composition distribution as assessed by CDBI values generally less than 55%. TREF data and calculations therefrom for determination of CDBI of a copolymer is readily calculated from data obtained from techniques known in the art, such as, for example, temperature rising elution fractionation as described, for example, in Wild et. al., *J. Poly. Sci. Poly. Phys. Ed.*, Vol. 20, p.441 (1982). Preferably, the homogeneous ethylene/alpha-olefin copolymers have a CDBI greater than about 70%, i.e., a CDBI of from about 70% to 99%. In general, the homogeneous ethylene/alpha-olefin copolymers useful in the present invention also exhibit a relatively narrow melting point range, in comparison with "heterogeneous copolymers", i.e., polymers having a CDBI of less than 55%. Preferably, the homogeneous ethylene/alpha-olefin copolymers exhibit an essentially singular melting point characteristic, with a peak melting point (Tm), as determined by Differential Scanning Calorimetry (DSC), of from about 60° C. to 105° C. Preferably the homogeneous copolymer has a DSC peak Tm of from about 80° C. to 100° C. As used herein, the phrase "essentially single melting point" means that at least about 80%, by weight, of the material corresponds to a single Tm peak at a temperature within the range of from about 60° C. to 105° C., and essentially no substantial fraction of the material has a peak melting point in excess of about 115° C., as determined by DSC analysis. DSC measurements are made on a Perkin Elmer System 7 Thermal Analysis System. Melting information reported are second melting data, i.e., the sample is heated at a programmed rate of 10° C./min. to a temperature below its critical range. The sample is then reheated (2nd melting) at a programmed rate of 10° C./min.

A homogeneous ethylene/alpha-olefin copolymer can, in general, be prepared by the copolymerization of ethylene and any one or more alpha-olefin. Preferably, the alpha-olefin is a C3–C20 alpha-monoolefin, more preferably, a C4–C12 alpha-monoolefin, still more preferably, a C4–C8 alpha-monoolefin. Still more preferably, the alpha-olefin comprises at least one member selected from the group consisting of butene-1, hexene-1, and octene-1, i.e., 1-butene, 1-hexene, and 1-octene, respectively. Most preferably, the alpha-olefin comprises octene-1, and/or a blend of hexene-1 and butene-1.

Processes for preparing and using homogeneous polymers are disclosed in U.S. Pat. No. 5,206,075, to HODGSON, Jr., U.S. Pat. No. 5,241,031, to MEHTA, and PCT International Application WO 93/03093, each of which is hereby incorporated by reference thereto, in its entirety. Further details regarding the production and use of homogeneous ethylene/alpha-olefin copolymers are disclosed in PCT International Publication Number WO 90/03414, and PCT International Publication Number WO 93/03093, both of which designate Exxon Chemical Patents, Inc. as the Applicant, and both of which are hereby incorporated by reference thereto, in their respective entireties.

Still another species of homogeneous ethylene/alpha-olefin copolymers is disclosed in U.S. Pat. No. 5,272,236, to LAI, et. al., and U.S. Pat. No. 5,278,272, to LAI, et. al., both of which are hereby incorporated by reference thereto, in their respective entireties.

As used herein, the term "polyolefin" refers to any polymerized olefin, which can be linear, branched, cyclic, aliphatic, aromatic, substituted, or unsubstituted. More specifically, included in the term polyolefin are homopolymers of olefin, copolymers of olefin, copolymers of an olefin and an non-olefinic comonomer copolymerizable with the olefin, such as vinyl monomers, modified polymers thereof, and the like. Specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of, for example, anhydride-modified polymers such as anhydride-modified LLDPE, anhydride-modified EVA, etc., such polymer being prepared by copolymerizing the homopolymer of the olefin or copolymer thereof with an unsaturated carboxylic acid, e.g., maleic acid, fumaric acid or the like, or a derivative thereof such as the anhydride, ester or metal salt or the like. It could also be obtained by incorporating into the olefin homopolymer or copolymer, an unsaturated carboxylic acid, e.g., maleic acid, fumaric acid or the like, or a derivative thereof such as the anhydride, ester or metal salt or the like.

As used herein, terms identifying polymers, such as "polyaride", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer, as well as modified polymers made by derivitization of a polymer after its polymerization. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type.

As used herein, the phrase "anhydride functionality" refers to any form of anhydride functionality, such as the anhydride of maleic acid, fumaric acid, etc., whether blended with one or more polymers, grafted onto a polymer, or copolymerized with a polymer, and, in general, is also inclusive of derivatives of such functionalities, such as acids, esters, and metal salts derived therefrom.

As used herein, the phrase "modified polymer", as well as more specific phrases such as "modified ethylene vinyl acetate copolymer", and "modified polyolefin" refer to such polymers having an anhydride functionality, as defined immediately above, grafted thereon and/or copolymerized therewith and/or blended therewith. Preferably, such modified polymers have the anhydride functionality grafted on or polymerized therewith, as opposed to merely blended therewith.

As used herein, the phrase "anhydride-containing polymer" refers to one or more of the following: (1) polymers obtained by copolymerizing an anhydride-containing monomer with a second, different monomer, and (2) anhydride grafted copolymers, and (3) a mixture of a polymer and an anhydride-containing compound.

The term "ionomer", as used herein, refers to a product of an ionic polymerization, i.e., a polymer containing interchain ionic bonding. Preferably, the ionomer comprises at least one member selected from the group consisting of a thermoplastic resin based on metal salt of an alkene/acid copolymer; more preferably, a thermoplastic resin based on metal salt of ethylene/acid copolymer; still more preferably, metal salt of ethylene/methacrylic acid copolymer. As used herein, the term "ionomer" also includes ethylene/acrylic acid copolymer and ethylene/acid/acrylate terpolymer.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE); as well as to such homogeneous ethylene/alpha olefin copolymers as: metallocene-catalyzed EXACT (TM) linear homogeneous ethylene/alpha olefin copolymer resins obtainable from the Exxon Chemical Company, of Baytown, Tex., homogeneous substantially linear ethylene/alpha-olefin copolymers having long chain branching (e.g., copolymers known as AFFINITY® resins, and ENGAGE® resins, available from the Dow Chemical Company, of Midland, Mich.), as well as TAFMER (TM) linear homogeneous ethylene/alpha-olefin copolymer resins obtainable from the Mitsui Petrochemical Corporation. The phrase ethylene/alpha-olefin copolymer is also inclusive of ethylene/alpha-olefin copolymers produced from mixed catalysts, e.g. using a combination of Ziegler Natta catalysis and single site catalysis such as metallocene catalysis. Exemplary of such resins are, for example, the line of resins known as Elite® enhanced polyethylene resins, available from The Dow Chemical Company, of Bayport, Tex. These resins are known to contain interpenetrating polymer networks ("IPN's"). Both the heterogeneous polymers and homogeneous polymers referred to above generally include copolymers of ethylene with one or more comonomers selected from $C_4$ to $C_{10}$ alpha-olefin such as butene-1 (i.e., 1-butene), hexene-1, octene-1, etc. While LDPE and MDPE are more highly branched than LLDPE, VLDPE, ULDPE, EXACT® resin, and TAFMER® resin, this latter group of resins has a relatively large number of short branches rather than the longer branches present in LDPE and MDPE. AFFINITY® resins and ENGAGE® resins have a relatively large number of short branches in combination with a relatively small number of long-chain branches. LLDPE has a density usually in the range of from about 0.91 grams per cubic centimeter to about 0.94 grams per cubic centimeter.

In general, the ethylene/alpha-olefin copolymer comprises a copolymer resulting from the copolymerization of from about 80 to 99 weight percent ethylene and from 1 to 20 weight percent alpha-olefin. Preferably, the ethylene alpha-olefin copolymer comprises a copolymer resulting from the copolymerization of from about 85 to 95 weight percent ethylene and from 5 to 15 weight percent alpha-olefin.

As used herein, the phrases "inner layer" and "internal layer" refer to any layer, of a multilayer film, having both of its principal surfaces directly adhered to another layer of the film.

As used herein, the phrase "inside layer" refers to an outer film layer, of a multilayer film packaging a product, which is closest to the product, relative to the other layers of the multilayer film. "Inside layer" also is used with reference to the innermost layer of a plurality of concentrically arranged layers simultaneously coextruded through an annular die.

As used herein, the phrase "outer layer" refers to any film layer of film having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces are adhered to another layer of the film.

As used herein, the phrase "outside layer" refers to the outer layer, of a multilayer film packaging a product, which is furthest from the product relative to the other layers of the multilayer film. "Outside layer" also is used with reference to the outermost layer of a plurality of concentrically arranged layers simultaneously coextruded through an annular die. Moreover, an outside layer has an "inside surface" and an "outside surface," the inside surface being that surface of the outside layer which is adhered to another film layer, and the outside surface of the outside layer being that surface which is not adhered to another film layer.

As used herein, the phrase "directly adhered", as applied to film layers, is defined as adhesion of the subject film layer to the object film layer, without a tie layer, adhesive, or other layer therebetween. In contrast, as used herein, the word "between", as applied to a film layer expressed as being between two other specified layers, includes both direct adherence of the subject layer between to the two other layers it is between, as well as including a lack of direct adherence to either or both of the two other layers the subject layer is between, i.e., one or more additional layers can be imposed between the subject layer and one or more of the layers the subject layer is between.

As used herein, the term "core", and the phrase "core layer", as applied to multilayer films, refer to any inner film layer which has a primary function other than serving as an adhesive or compatibilizer for adhering two layers to one another. Usually, the core layer or layers provide the multilayer film with a desired level of strength, i.e., modulus, and/or optics, and/or added abuse resistance, and/or specific impermeability.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. It should also be recognized that in general, up to the outer 3 mils of a film can be involved in the sealing of the film to itself or another layer. With respect to packages having only fin-type seals, as opposed to lap-type seals, the phrase "sealant layer" generally refers to the inside film layer of a package, as well as supporting layers within 3 mils of the inside surface of the sealant layer, the inside layer frequently also serving as a food contact layer in the packaging of foods. In general, sealant layers employed in the packaging art have included thermoplastic polymers, such as polyolefin (e.g., linear low density polyethylene, very low density polyethylene, homogeneous polymers such as metallocene catalyzed ethylene/alpha-olefin copolymer, etc), polyamide, polyester (e.g., polyethylene terephthalate glycol), ethylene/ester copolymer (e.g., ethylene/vinyl acetate copolymer), ionomer, etc.

As used herein, the phrase "heat seal" refers to joint between a film and another object, preferably another film, via any one or more of a number of means for sealing through the use of heat, including thermal sealing, melt bead sealing, impulse sealing, dielectric sealing, ultrasonic sealing, etc.

As used herein, the phrases "heat-shrinkable," "heat-shrink" and the like refer to the tendency of a film, generally an oriented film, to shrink upon the application of heat, i.e., to contract upon being heated, such that the size (area) of the film decreases while the film is in an unrestrained state decreases. Likewise, the tension of a heat-shrinkable film increases upon the application of heat if the film is restrained from shrinking. As a corollary, the phrase "heat-contracted" refers to a heat-shrinkable film, or a portion thereof, which has been exposed to heat such that the film or portion thereof is in a heat-shrunken state, i.e., reduced in size (unrestrained) or under increased tension (restrained). Preferably, the heat shrinkable film has a total free shrink (i.e., machine direction plus transverse direction), as measured by ASTM D 2732, of at least as 5 percent at 185° F., more preferably at least 7 percent, still more preferably, at least 10 percent, and, yet still more preferably, at least 20 percent.

As used herein, the phrase "tie layer" refers to any inner film layer having the primary purpose of adhering two layers to one another. Tie layers can comprise any polymer having a polar group thereon, or any other polymer which provides sufficient interlayer adhesion to adjacent layers comprising otherwise nonadhering polymers.

As used herein, the phrase "skin layer" refers to an outside layer of a multilayer film in packaging a product, this skin layer being subject to abuse.

As used herein, the phrase "bulk layer" refers to any layer of a film which is present for the purpose of increasing the abuse-resistance, toughness, modulus, etc., of a multilayer film. Bulk layers generally comprise polymers which are inexpensive relative to other polymers in the film which provide some specific purpose unrelated to abuse-resistance, modulus, etc.

The names "first layer", "second layer", as used herein, are generally indicative of the manner in which a multilayer film structure is built up. That is, in general, the first layer can be present without any of the additional layers described, or the first and second layers can be present without any of the additional layers described, etc.

As used herein, the term "extrusion" is used with reference to the process of forming continuous shapes by forcing a molten plastic material through a die, followed by cooling or chemical hardening. Immediately prior to extrusion through the die, the relatively high-viscosity polymeric material is fed into a rotating screw of variable pitch, i.e., an extruder, which forces the polymeric material through the die.

As used herein, the term "coextrusion" refers to the process by which the outputs of two or more extruders are brought smoothly together in a feed block, to form a multilayer stream that is fed to a die to produce a layered extrudate. Coextrusion can be employed in film blowing, sheet and flat film extrusion, blow molding, and extrusion coating.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards,* Vol. 08.02, pp. 368–371, which is hereby incorporated, in its entirety, by reference thereto.

The multilayer films useful in the article and process of the present invention has at least 4 layers (preferably from 4 to 20 layers), and preferably has from 4 to 12 layers; still more preferably, from 4 to 11 layers; and yet still more preferably, from 6 to 10 layers). However, so long as the multilayer film has at least 4 layers, the multilayer film can have any further number of additional layers desired, so long as the film provides the desired properties for the particular packaging operation in which the film is used, e.g. $O_2$-barrier characteristics, free shrink, shrink tension, optics, modulus, seal strength, etc. The multilayer film illustrated in FIG. 1 comprises 9 layers. The multilayer film illustrated in FIG. 2 comprises 5 layers.

The multilayer film used in the present invention can have any total thickness desired, so long as the film provides the desired properties for the particular packaging operation in which the film is used. Preferably, the film has a total thickness of less than about 20 mils, more preferably the film has a total thickness of from about 2 to 20 mils, still more preferably from about 2 to 10 mils, and yet still more preferably, from about 2 to 6 mils.

Optionally, but preferably, the film of the present invention is irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce cross-linking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film.

To produce crosslinking, a suitable radiation dosage of high energy electrons, preferably using an electron accelerator, with a dosage level being determined by standard dosimetry methods. Other accelerators such as a Van de Graaf generator or resonating transformer may be used. The radiation is not limited to electrons from an accelerator since any ionizing radiation may be used. The ionizing radiation can be used to crosslink the polymers in the film. Preferably, the film is irradiated at a level of from 0.5–15 MR (5–150 kGy), more preferably 1–8 MR (10–80 kGy), still more preferably, about 3 to 5 MR (30–50 kGy). As can be seen from the descriptions of preferred films for use in the present invention, the most preferred amount of radiation is dependent upon the film composition, thickness, etc., and its end use. Chemical crosslinking can also be utilized, together with electronic crosslinking, or in place of electronic crosslinking.

As is known to those of skill in the art, various polymer modifiers may be incorporated for the purpose of improving toughness and/or orientability or extensibility of the film. Other modifiers which may be added include: modifiers which improve low temperature toughness or impact strength, and modifiers which reduce modulus or stiffness. Exemplary modifiers include: styrene-butadiene, styrene-isoprene, and ethylene-propylene.

As stated above, one or more layers in the multilayer film in the article of the present invention can comprise polystyrene. Polystyrene is relatively brittle and stiff (i.e., high modulus) in comparison with ethylene based polymers, and also has relatively low elongation in comparison with ethylene based polymers. Orientation can be used to improve the toughness of polystyrene. In addition, blending of particulate rubber with polystyrene improves the impact strength of the polystyrene. Such blends are referred to as High Impact Polystyrene (HIPS). Still, HIPS is relatively brittle. It has been found that brittleness can be reduced by blending with the polystyrene styrene-butadiene copolymer and/or styrene-isoprene copolymer. Conventional polystyrene, as well as high impact polystyrene, are available from both The Dow Chemical Company and BASF Corporation.

In the packaging of dry pet food, one of the main concerns is oxidation of the dry food product. Oxidation in pet food comes from the fat added to the pet food, mineral premixes, and flavor additives such as bloodmeal. Oxidation is a concern because animals begin to discriminate against food that has reached a peroxide value of 20 microequivalent/kg. Peroxide value is the pet food industry standard indicator of oxidation. To combat oxidation, pet food manufacturers use chemical and natural antioxidants (food preservatives). Antioxidants allow for the stability of vitamins, minerals, fatty acids and protein, and the reduction of oxidative rancidity, off flavors and off odors. Natural antioxidants are more expensive than chemical antioxidants. Natural antioxidants include tocopherols, acetic acid and citric acid. Chemical antioxidants include ethoxyquin. A long-term study on the side effects of chemical antioxidants are not available. However, by providing packaging which contains a barrier to $O_2$, there can be a reduction in the amount of natural and/or chemical preservatives used in the packaging. In addition, the presence of an $O_2$-barrier lengthens the shelf life of the packaged product.

Figure 2A:
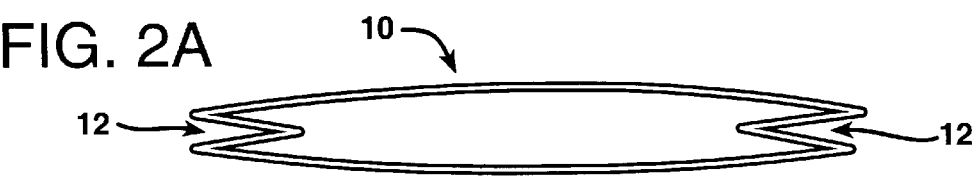
FIG. 2A illustrates a cross-sectional view of a first embodiment of the side-gusseted bag illustrated in FIG. 1.
Figure 2B:
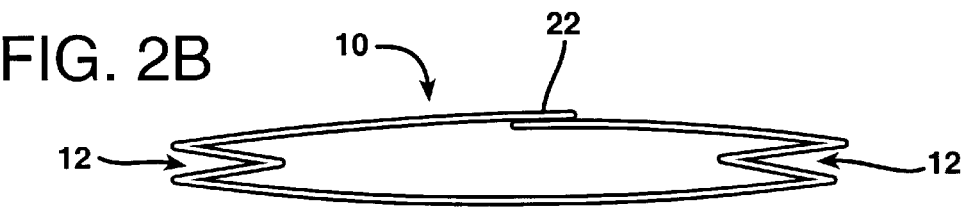
FIG. 2B illustrates a cross-sectional view of a second embodiment of the side-gusseted bag illustrated in FIG. 1.
Figure 2C:
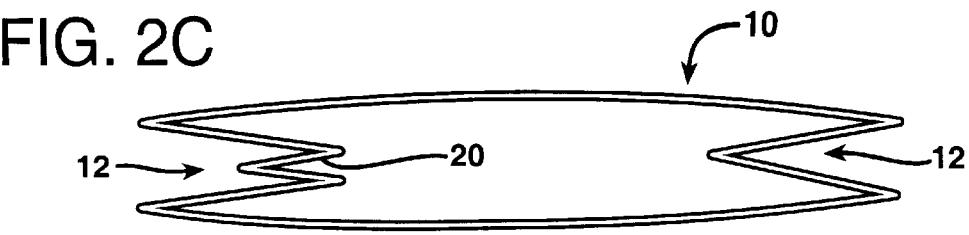
FIG. 2C illustrates a cross-sectional view of a third embodiment of the side-gusseted bag illustrated in FIG. 1.

FIG. 1 illustrates a perspective view of gusseted bag 10 in accordance with the present invention. Gusseted bag 10 has side gussets 12, open top 14, bottom edge 16, and seal region 18. FIGS. 2A, 2B, and 2C illustrate various cross-sectional views taken through section 2—2 of FIG. 1. FIG. 2A illustrates a tubular, seamless cross-section of gusseted bag 10, including side gussets 12. FIG. 2B illustrates a tubular cross-sectional view of gusseted bag 10, including side gussets 12 and lap seal 22. FIG. 2C illustrates a tubular cross-section of gusseted bag 10, including side gussets 12 and side-seal 20 (a fin seal).

Figure 3:
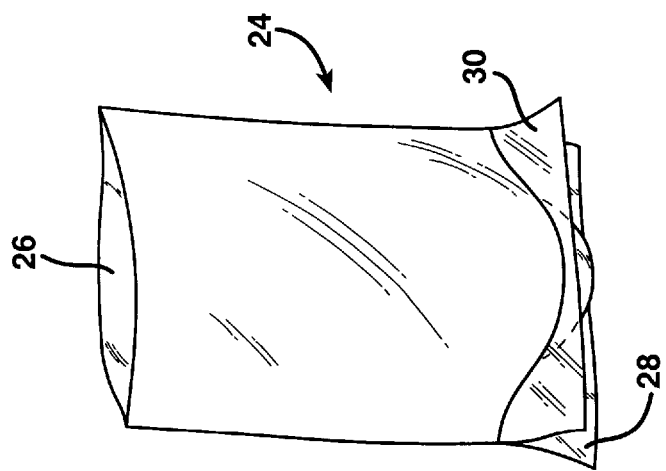
FIG. 3 illustrates a perspective view of a bottom-gusseted bag in accordance with the present invention.

FIG. 3 illustrates a perspective view of alternative gusseted bag 24 having open top 26, bottom gusset 28, and bottom seal region 30.

Figure 5:
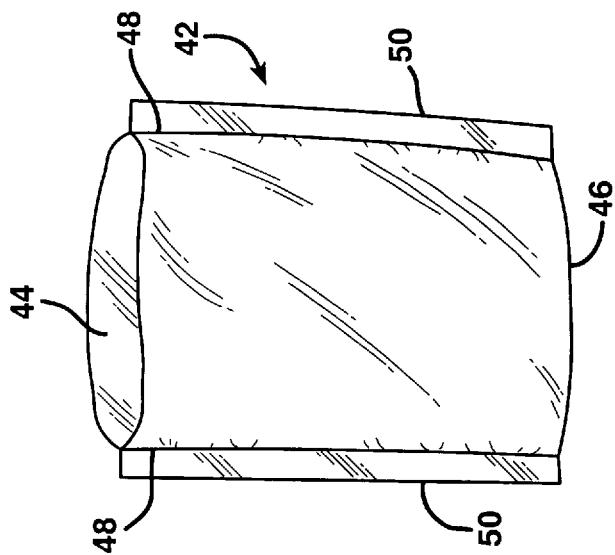
FIG. 5 illustrates a lay-flat view of an side-seal bag in accordance with the present invention.
Figure 4:
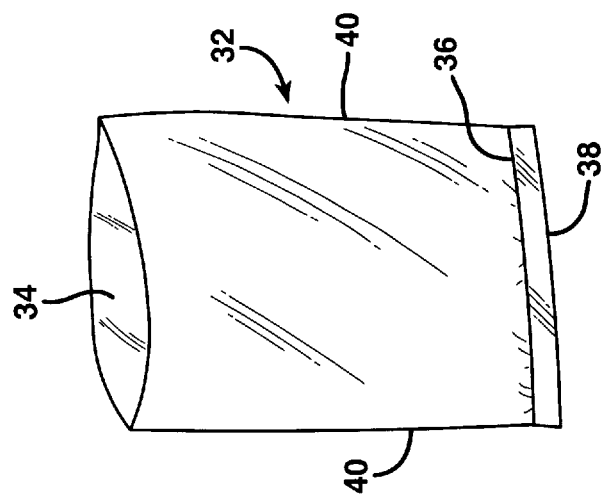
FIG. 4 illustrates a lay-flat view of an end-seal bag in accordance with the present invention.

FIG. 4 illustrates a schematic view of non-gusseted end-seal bag 32, having open top 34, end seal 36, bottom edge 38, and seamless (folded) side edges 40. FIG. 5 illustrates a schematic view of non-gusseted side-seal bag 42 having open top 44, seamless (folded) bottom edge 46, side seals 48, and side edges 50.

Figure 6:
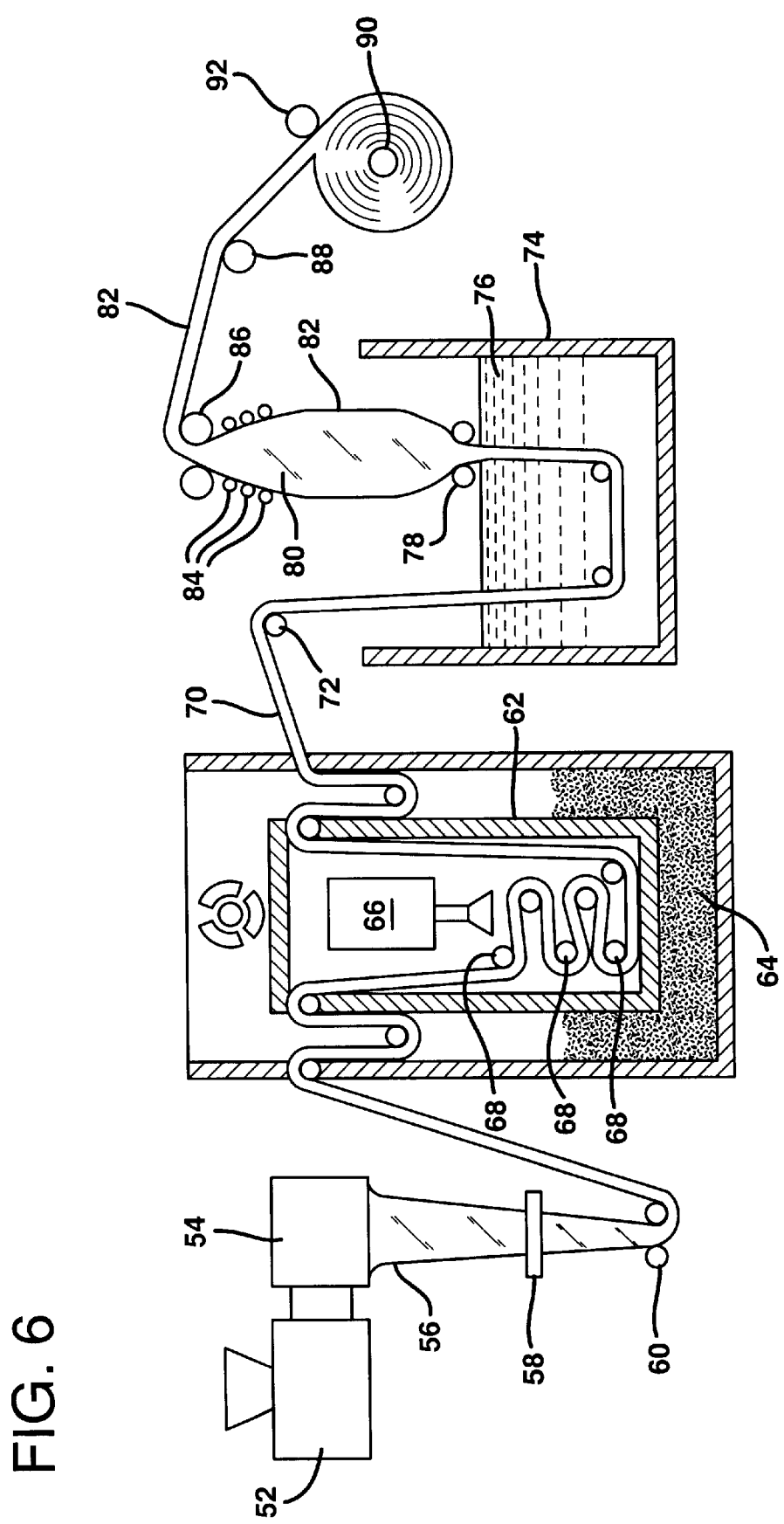
FIG. 6 illustrates a schematic view of a process for making part or all of the multilayer film suitable for use in the article of the present invention.

FIG. 6 illustrates a schematic of a preferred process for producing the multilayer films suitable for use in the article of the present invention. In the process illustrated in FIG. 6, solid polymer beads (not illustrated) are fed to a plurality of extruders 52 (for simplicity, only one extruder is illustrated). Inside extruders 52, the polymer beads are forwarded, melted, and degassed, following which the resulting bubble-free melt is forwarded into die head 54, and extruded through annular die, resulting in tubing 56 which is 5–40 mils thick, more preferably 20–30 mils thick, still more preferably, about 25 mils thick.

After cooling or quenching by water spray from cooling ring 58, tubing 56 is collapsed by pinch rolls 60, and is thereafter fed through irradiation vault 62 surrounded by shielding 64, where tubing 56 is irradiated with high energy electrons (i.e., ionizing radiation) from iron core transformer accelerator 66. Tubing 56 is guided through irradiation vault 62 on rolls 68. Preferably, the irradiation of tubing 56 is at a level of from about 2 to 10 megarads (hereinafter "MR").

After irradiation, irradiated tubing 70 is directed over guide roll 72, after which irradiated tubing 70 passes into hot water bath tank 74 containing water 76. The now collapsed irradiated tubing 70 is submersed in the hot water for a retention time of at least about 5 seconds, i.e., for a time period in order to bring the film up to the desired temperature, following which supplemental heating means (not illustrated) including a plurality of steam rolls around which irradiated tubing 70 is partially wound, and optional hot air blowers, elevate the temperature of irradiated tubing 70 to a desired orientation temperature of from about 240° F.–250° F. Thereafter, irradiated film 70 is directed through nip rolls 78, and bubble 80 is blown, thereby transversely stretching irradiated tubing 70. Furthermore, while being blown, i.e., transversely stretched, irradiated film 70 is drawn (i.e., in the longitudinal direction) between nip rolls 78 and nip rolls 86, as nip rolls 86 have a higher surface speed than the surface speed of nip rolls 78. As a result of the transverse stretching and longitudinal drawing, irradiated, biaxially-oriented, blown tubing film 82 is produced, this blown tubing preferably having been both stretched at a ratio of from about 1:1.5–1:6, and drawn at a ratio of from about 1:1.5–1:6. More preferably, the stretching and drawing are each performed at a ratio of from about 1:2–1:4. The result is a biaxial orientation of from about 1:2.25–1:36, more preferably, 1:4–1:16.

While bubble 80 is maintained between pinch rolls 78 and 86, blown tubing 82 is collapsed by rolls 84, and thereafter conveyed through pinch rolls 86 and across guide roll 88, and then rolled onto wind-up roller 90. Idler roll 92 assures a good wind-up.

Figure 7:
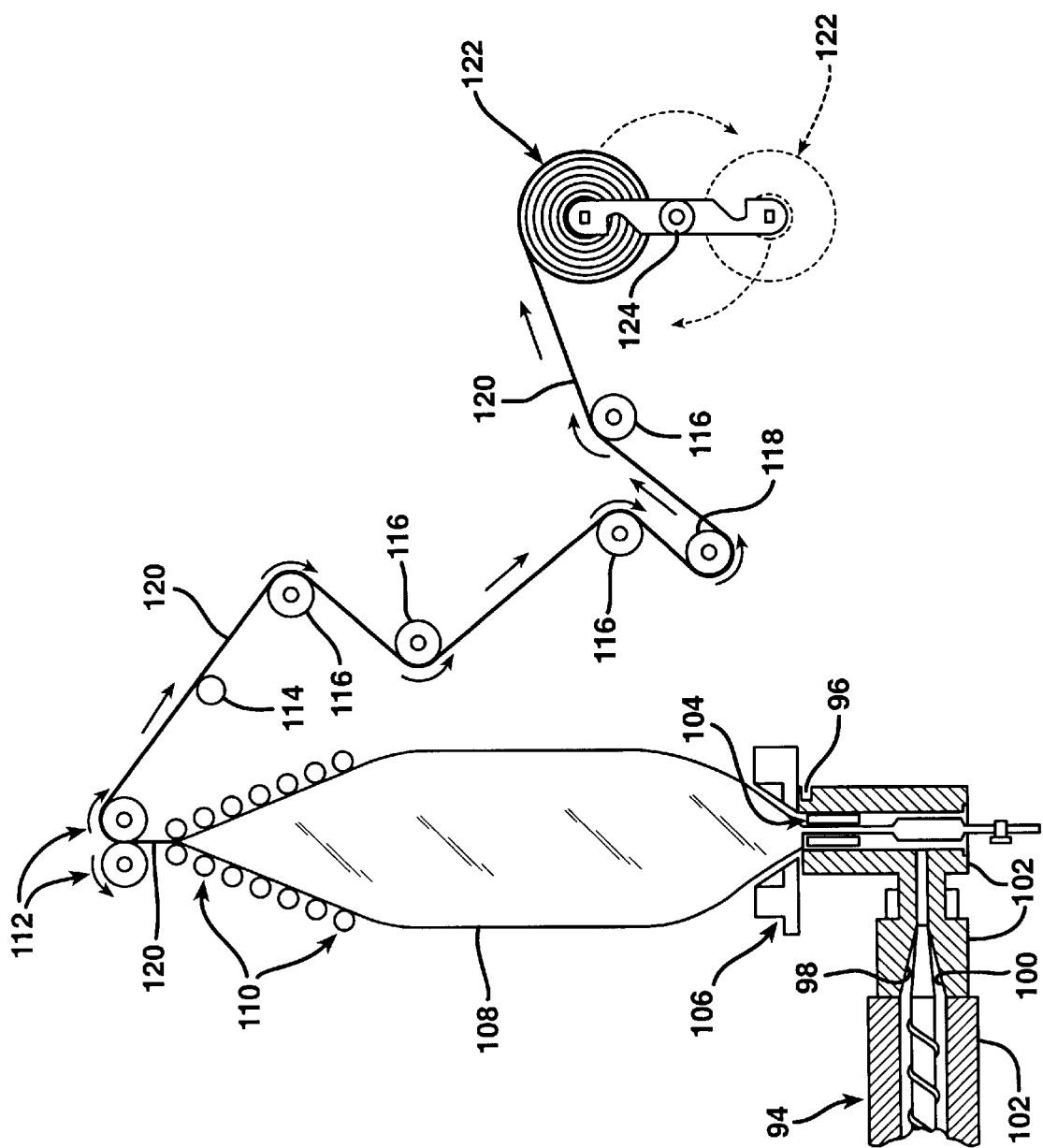
FIG. 7 illustrates a schematic view of another process for making part or all of the multilayer film which is suitable for use in the article of the present invention.

FIG. 7 illustrates a schematic view of another process for making multilayer film for use in the article according to the present invention. Although for the sake of simplicity only one extruder 94 is illustrated in FIG. 7, there are preferably at least 2 extruders, and more preferably, at least three extruders. That is, preferably at least one extruder, and more preferably two extruders, supply molten polymer to coextrusion die. Each of the extruders is supplied with polymer pellets suitable for the formation of the respective layer it is extruding. The extruders subject the polymer pellets to sufficient pressure and heat to melt the polymer and thereby prepare it for extrusion through a die.

Taking extruder 94 as an example, each of the extruders is preferably equipped with a screen pack 98, a breaker plate 100, and a plurality of heaters 102. Each of the coextruded film layers is extruded between mandrel 104 and die 96, and the extrudate is cooled by cool air flowing from air ring 106. The resulting blown bubble is thereafter guided into a collapsed configuration by nip rolls 112, via guide rolls 110. The collapsed tube is optionally passed over treater bar 114, and is thereafter passed over idler rolls 116, and around dancer roll 118 which imparts tension control to collapsed tube 120, after which the collapsed tube is wound into roll 122 via winding mechanism 124.

Figure 8:
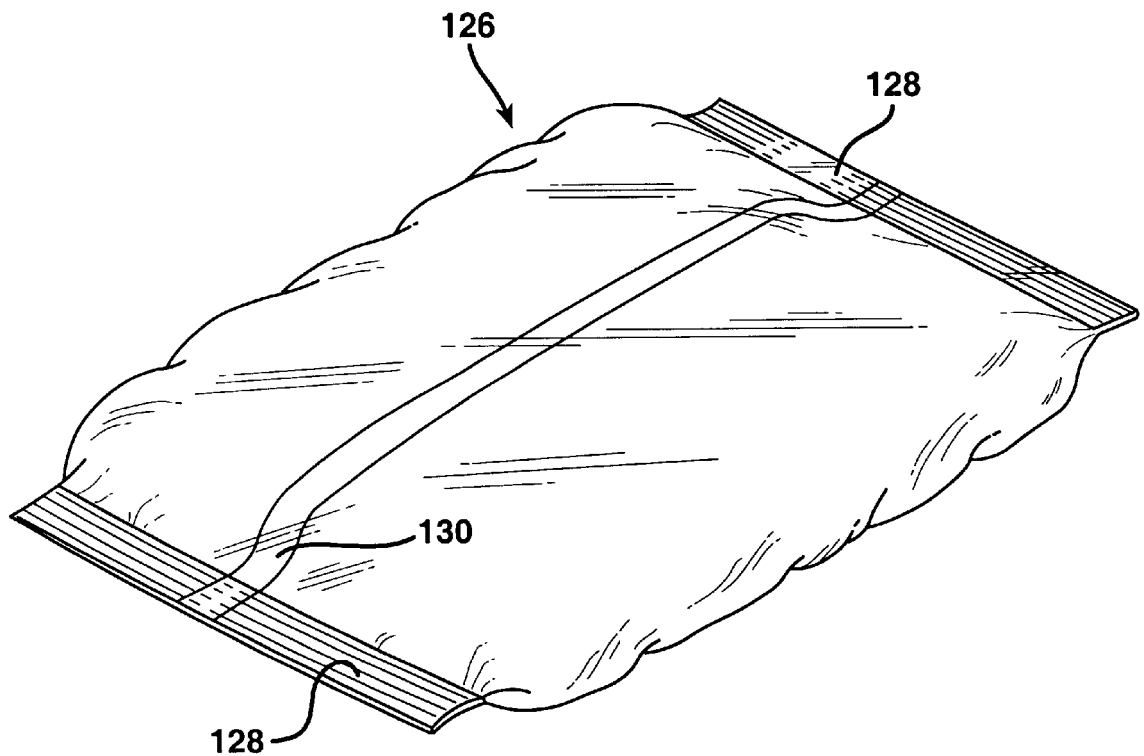
FIG. 8 illustrates a perspective view of a packaged product in accordance with the present invention.

FIG. 8 illustrates a perspective view of packaged product 126 in accordance with the present invention. Packaged product 126 has transverse end seals 128 and longitudinal seal 130, which can be either a lap seal or a fin seal. Packaged product 128 is preferably produced using form-fill-and-seal equipment, and preferably contains a hard, flowable food product, e.g., dry dog food.

Figure 9:
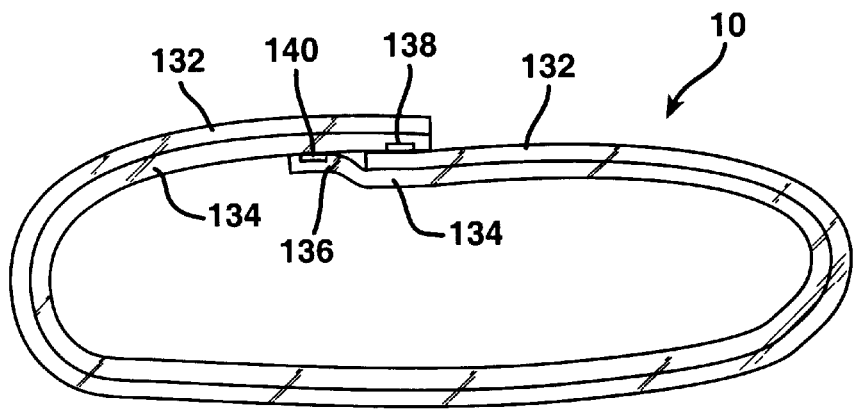
FIG. 9 is an enlarged version of the bag shown in FIG. 2B.

This arrangement is illustrated in FIG. 9, which is an enlarged variation of the cross-sectional view of gusseted bag 10 illustrated in FIG. 2B. In FIG. 9, first component film 132 is laminated to second component film 134 in an offset manner, so that lip 136 of second component film 134 extends outward from first component film 132. Lip 136 extends the entire length of gusseted bag 10. First lap seal 138 is formed by heat sealing first component film 132 to second component film 134. Second lap seal 140 is formed by heat sealing lip 136 of second component film 132 an inside-facing surface of second component film 136, i.e., by heat-sealing second component film 132 to itself. In this manner, two seals are formed. Heat seal 138 is of the first component film 132 to second component film 134, and is a relatively weak seal because of the presence of slip agent in the outer surface of first component film 132. However, heat seal 140 is considerably stronger than heat seal 138, as second component film 134 has no slip agent therein. The alternative seal as illustrated in FIG. 9 is preferable to the conventional lap seal illustrated in FIG. 2B, in order to provide a package having a higher seal strength.

EXAMPLES

Examples 1 through 4, below, are directed to two preferred multilayer films for use in the article according to the present invention. Examples 5, 6, and 7 are comparative examples which exemplify the structure of several films currently in commercial use for the packaging of dry pet food. Whereas the films of Examples 1 through 4 contained over 90% (by volume) ethylene based polymer, the films of Examples 5, 6, and 7 contained polyester and/or polyamide in respective total amounts of about 25 volume percent, 16 volume percent, and 20 volume percent. Examples 8 and 9 are further examples of preferred multilayer films for use in the article according to the present invention. Example 10 is a comparative example of a plastic-lined, paper-based gusseted bag.

Example 1

(Laminated Film No. 1)

The preparation of a Laminated Film No. 1 was carried out by casting a solid tape using a coextrusion die, using the process illustrated in FIG. 6, discussed above. The tape was irradiated with about 3 megarads of irradiation. The tape was then heated to about 115° C. in an oven and blown into a bubble. The bubble was expanded to about 3.2 times its original dimensions in both the machine (longitudinal) and transverse directions, and then deflated and ply-separated into single-wound film rolls. The final film had a thickness of about 1.0 mil. The first substrate was corona treated and reverse-printed on a flexography press.

A second component film was prepared in a similar manner, i.e., also using the process illustrated in FIG. 6, discussed above. The tape outer layer had a major proportion of linear low density polyethylene and a minor portion of an ethylene vinyl acetate. The inner layer was ethylene/vinyl acetate copolymer having a vinyl acetate content of 28 weight percent. In order to prevent the inner layers of tape from self-adhering, the inside surface of the tubular tape was coated powdered cornstarch. The tape was irradiated at 4.0 megarads. The tubular tape was flattened and reheated to 115° C. in an oven, and blown into a bubble. The bubble was expanded to about 3x its original dimensions in both the machine and transverse directions, for a total orientation of 600%. The collapsed and flattened tubing adhered to itself because the expansion of the film reduced the concentration of the corn starch to a level low enough that self-welding would occur. Hence, ply-separation was not required, and a single-wound film roll was produced, this film being the second component film.

The first component film was then laminated to the second component film, using a polyurethane adhesive. During the laminating process, both component films were corona treated in-line. The corona treatment was done to achieve a dyne level above 40. The corona treatment enhanced the bond strength between the laminated films. The resulting Laminated Film No. 1 had a thickness of about 4.3 mil.

Laminated Film No. 1 was then converted into side-gusseted bags and bottom-gusseted bags. A VERTROD® impulse heat sealing machine was used to manually prepare bags. The machine applied an impulse heat seal in the conversion of the film to bags. The bags were filled with various types of hard, dry dog and cat food, with the product being sealed in the bag. Testing of the packaged product was then conducted.

Table 1, below, provides the details of the first and second component films, including the identity of the various polymers present in each of the film layers, the arrangement of each of the film layers, the relative proportions of each of the polymers in each of the film layers, and the thickness of each of the film layers. The bag was formed by sealing the second component film to itself to form the gusseted bag.

TABLE 1

| LAYER COMPOSITION | LAYER THICKNESS (mils) |
|---|---|
| First Component Film | |
| blend of 50% LLDPE #1, 20% LLDPE #2, 10% EVA #1, and 15% Slip/Antiblock Masterbatch | 0.45 |
| 100% Polymeric Adhesive | 0.12 |
| blend of 90% EVOH, 10% Nylon 6/Nylon 12 Copolymer | 0.18 |

TABLE 1-continued

| LAYER COMPOSITION | LAYER THICKNESS (mils) |
|---|---|
| 100% Polymeric Adhesive | 0.11 |
| blend of 50% LLDPE #1, 25% LLDPE #2, 25% EVA #1 | 0.24 |
| Laminating Adhesive Layer between First and Second Component Films | |
| Laminating Adhesive | 0.20 |
| Second Component Film | |
| 87% LLDPE #1, 10% EVA #2, 3% Color Concentrate | 1.29 |
| EVA #3 | 0.46 |
| 87% LLDPE #1, 10% EVA #2, 3% Color Concentrate | 1.26 |

In Table 1 above:

LLDPE #1 was DOWLEX® 2045 linear low density polyethylene, obtained from Dow Plastics of Freeport, Tex.;

LLDPE #2 was DOWLEX® 2037 linear low density polyethylene, obtained from Dow Plastics of Freeport, Tex.;

EVA #1 was PE 1335 ethylene/vinyl acetate copolymer having a vinyl acetate content about 3.3% by weight, obtained from Rexene;

EVA #2 was ESCORENE® LD 318.92 ethylene vinyl acetate having vinyl acetate content of 9% by weight, obtained from Exxon Chemical Corporation of Houston, Tex.;

EVA #3 was ESCORENE® LD 761.36 ethylene vinyl acetate having vinyl acetate content of 28%, obtained from Exxon Chemical Corporation of Houston, Tex.;

Nylon 6/Nylon 12 Copolymer was GRILLON® CF-6S, obtained from Emser, of Atlanta, Ga.;

EVOH was EVAL® LC-F101A, obtained from Evalca, of Lisle, Ill.

"Polymeric Adhesive" was ADMER® SF 700 A anhydride grafted polyolefins blend, obtained from Mitsui Petrochemicals (America), Ltd., New York, N.Y.;

"Laminating Adhesive" was a solvent-based adhesive of three components by weight; the three components were: 37% ADCOTE® 545-E Adhesive with 60% solids, 3.7% Catalyst F, diisocyanate with 75% solids, and 59.2% ethyl acetate solvent; all three components were obtained from Morton International of Chicago, Ill.; and "Color Concentrate" was 80,274 ACP® Cream Concentrate based in low density polyethylene having 15% pigment, obtained from Teknor Color; and "Slip/Antiblock Masterbatch" was a conventional masterbatch containing silica and waxes, for the purpose of improving the slip and antiblock characteristics of the resulting film.

Example 2

(Laminated Film No. 2)

Laminated Film No. 2 was identical to Laminated Film No. 1, except that EMAC was substituted for the 28% VA EVA in second component film. The EMAC had low odor when compared to EVA and was therefore a better choice for packaging pet food (as pets generally have a keen sense of smell). This second component was crosslinked at about 7 mR (50 kGY). A gusseted bag was made by sealing the second component film to itself.

TABLE 2

| LAYER COMPOSITION | LAYER THICKNESS (mils) |
|---|---|
| First Component Film | |
| blend of 50% LLDPE #1, 20% LLDPE #2, 10% EVA #1, and 15% Slip/Antiblock Masterbatch | 0.45 |
| 100% Polymeric Adhesive | 0.12 |
| blend of 90% EVOH, 10% Nylon 6/Nylon 12 Copolymer | 0.18 |
| 100% Polymeric Adhesive | 0.11 |
| blend of 50% LLDPE #1, 25% LLDPE #2, 25% EVA #1 | 0.24 |
| Laminating Adhesive Layer between First and Second Component Films | |
| Laminating Adhesive | 0.20 |
| Second Component Film | |
| blend of 95.5% LLDPE #1 and 4.5% slip antiblock masterbatch | 1.92 |
| EMAC | 0.675 |
| blend of 95.5% LLDPE and 4.5% slip antiblock masterbatch | 1.91 |

In Table 2 above:

EMAC was DS4314-80 ethylene methyl acrylate copolymer having 23% methyl acrylate, obtained from Chevron Corp. of Houston, Tex.

Antiblock Concentrate was 10,183ACP Syloid® concentrate in a LDPE resin, obtained from Teknor Corp. of RI.

It should be noted that an alternative preferred film similar to Laminated Film Nos. 1 and 2 (above) could have the EVA in the outer film layers replaced with an ultra low density polyethylene, such as ATTANE® ultra low density polyethylene, obtainable from The Dow Chemical Company, identified above.

Example 3

(Laminated Film No. 3)

A first coextruded, oriented component film was laminated to a second coextruded, oriented component film, resulting in a Laminated Film No. 3, having the structure set forth in Table 3, immediately below. A gusseted bag was made by sealing the second component film to itself.

TABLE 3

| LAYER COMPOSITION | LAYER THICKNESS (mils) |
|---|---|
| First Component Film | |
| blend of 50% LLDPE #1, 20% LLDPE #2, 10% EVA #1, and 15% Slip/Antiblock Masterbatch | 0.45 |
| 100% Polymeric Adhesive | 0.12 |
| blend of 90% EVOH, 10% Nylon 6/Nylon 12 Copolymer | 0.18 |
| 100% Polymeric Adhesive | 0.11 |
| blend of 50% LLDPE #1, 25% LLDPE #2, 25% EVA #1, | 0.24 |
| Laminating Adhesive between First and Second Component Films | |

TABLE 3-continued

| LAYER COMPOSITION | LAYER THICKNESS (mils) |
|---|---|
| Laminating Adhesive | 0.20 |
| Second Component Film | |
| 87% LLDPE #1, 10% EVA #2, 3% Color Concentrate | 1.91 |
| EVA #3 | 0.73 |
| 87% LLDPE #1, 10% EVA #2, 3% Color Concentrate | 1.89 |

The various resins and other compositions listed in TABLE 3 are as identified below TABLE 1, above.

Example 4
(Laminated Film No. 4)

Laminated Film No. 4 was produced in a manner similar to the production of Laminated Films Nos. 1–3. The first component film had two layers of EVOH. The EVOH layers contained about 20 percent, by weight, Surlyn® AM7927 ionomer resin blended with the EVOH resin, in order to improve orientability of EVOH. The second component film was a reverse-printed film laminated to the first component film. A gusseted bag was made by sealing the first component film to itself.

TABLE 3

| LAYER COMPOSITION | LAYER THICKNESS (mils) |
|---|---|
| First Component Film | |
| blend of 80% LLDPE #A, 20% White Color Concentrate | 1.28 |
| 100% Polymeric Adhesive #A | 0.23 |
| blend of 80% EVOH, 20% N-ionomer | 0.14 |
| 100% Polymeric Adhesive #A | 0.25 |
| 100% EVA | 0.66 |
| 100% Polymeric Adhesive | 0.24 |
| blend of 80% EVOH and 20% N-ionomer | 0.13 |
| 100% Polymeric Adhesive | 0.23 |
| blend of 80% LLDPE #A, 20% White Color Concentrate | 1.29 |
| Laminating Adhesive Layer between First and Second Component Films | |
| Laminating Adhesive | 0.20 |
| Second Component Film | |
| blend of 92% EPC #1 ethylene propylene copolymer #1 and 8% PP #1 | 0.19 |
| 100% LLDPE #1 | 0.60 |
| blend of 92% EPC #1 ethylene propylene copolymer #1 and 8% PP #1 | 0.21 |

LLDPE #A was Elite® 5400 Enhanced Polyethylene ethylene/alpha-olefin copolymer, obtained from The Dow Chemical Company of Freeport, Tex.;

White Color Concentrate was A130195 white color concentrate comprising of 48% LDPE, 48% titanium dioxide and 4% silica, obtained from Plastics Color Chip Inc., of Asheboro, N.C.;

"Polymeric Adhesive" was Tymor® 1203 anhydride grafted polyolefin blend, obtained from Morton International of Chicago, Ill.

EVOH was EVAL® LC-F101A, obtained from Evalca, of Lisle, Ill.

N-Ionomer was Surlyn® AM7927, nylon containing ionomer for blending with EVOH, obtained from DuPont of Wilmington, Del.;

EVA #3 was ESCORENE® LD 761.36 ethylene vinyl acetate having vinyl acetate content of 28%, obtained from Exxon Chemical Corporation of Houston, Tex.;

EPC #1 was ESCORENE® PD-9302 E1 ethylene propylene copolymer having 4.4% random ethylene, obtained from Exxon Chemical Corporation of Houston, Tex.;

PP #1 is ESCORENE® PD 4062.E7 homopolymer polypropylene, obtained from Exxon Chemical Corporation of Houston, Tex.; and "Laminating Adhesive" was a solvent-based adhesive of three components by weight; the three components were: 37% ADCOTE® 545-E Adhesive with 60% solids, 3.7% Catalyst F, diisocyanate with 75% solids, and 59.2% ethyl acetate solvent; all three components were obtained from Morton International of Chicago, Ill.

Example 5
(Comparative)

A three-layer film having the following structure was obtained and analyzed, and found to have the following structure:

TABLE 5

| LAYER COMPOSITION | LAYER THICKNESS (mils) |
|---|---|
| Polyethylene terephthalate | 0.45 |
| Laminating Adhesive | 0.12 |
| Polyethylene | 0.48 |
| Laminating Adhesive | 0.08 |
| Polyethylene terephthalate | 0.51 |
| Laminating Adhesive | 0.11 |
| Polyethylene | 4.36 |

The film of Example 5 (Comparative) had a polyethylene content of 79% (volume basis) and a polyester content of 17% (volume basis), and had a total thickness of 6.11 mils. In the gusseted bag, the polyethylene layer was sealed to itself.

Example 6
(Comparative)

A three-layer film having the following structure was obtained and analyzed, and found to have the following structure:

TABLE 6

| LAYER COMPOSITION | LAYER THICKNESS (mils) |
|---|---|
| Polyethylene | 4.25 |
| Laminating Adhesive | 0.08 |
| Polyamide | 1.03 |
| Laminating Adhesive | 0.08 |
| Polyethylene terephthalate | 0.49 |

The film of Example 6 (Comparative) had a polyethylene content of 71.7% (volume basis), a polyester, and polyamide content of 25.6% (volume basis), and a total thickness of 5.93 mils. In the gusseted bag, the polyethylene layer was sealed to itself

Example 7

(Comparative)

A three-layer comparative film having the following structure was obtained and analyzed, and found to have the following structure:

TABLE 7

| LAYER COMPOSITION | LAYER THICKNESS (mils) |
|---|---|
| Polyethylene terephthalate | 1.0 |
| Adhesive | 0.1 |
| Linear Low Density Polyethylene | 4.0 |

The film of Example 7 (Comparative) had a polyethylene content of 78.4% (volume basis), a polyester content of 19.6% (volume basis), and an adhesive content of 2.0 percent, and had a total thickness of 5.1 mils. In the gusseted bag, the linear low density polyethylene layer was sealed to itself.

Example 8

(Laminated Film No. 8)

Laminated Film No. 8 was another preferred film for use in the article according to the present invention. However, Laminated Film No. 8 was made by laminating a first component film (a multilayer film) to a second component film (a monolayer film) which contained only high density polyethylene (HDPE). The first component film was prepared by a process in accordance with FIG. 6, discussed above. The second component film was prepared by a process in accordance with FIG. 7, also discussed above. The resulting Laminated Film No. 8 had a total of 5 layers (including one layer of laminating adhesive). Laminated Film No. 8 exhibited high stiffness (i.e., high modulus) and outstanding tear resistance, together with high gloss and good printability. Laminated Film No. 8 was especially advantageous for providing a gusseted bag having excellent self-supporting characteristics. The gusseted bag was formed by sealing the first component film to itself Laminated Film No. 8 had the structure set forth in Table 8, below.

TABLE 8

| LAYER COMPOSITION | LAYER THICKNESS (mils) |
|---|---|
| First Component Film | |
| 87% LLDPE #1, 10% EVA #2, 3% Color Concentrate | 1.29 |
| EVA #3 | 0.46 |
| 87% LLDPE #1, 10% EVA #2, 3% Color Concentrate | 1.26 |
| Laminating Adhesive between First and Second Component Films | |
| Laminating Adhesive | 0.20 |
| Second Component Film | |
| blend of 60% HDPE and 30% White Concentrate | 2.98 | wherein;

HDPE was Hid9659 high density polyethylene, obtained from Chevron Chemicals of Houston, Tex., and White Concentrate was A130175 white color concentrate comprising of 48% LDPE, 48% titanium dioxide and 4% silica, obtained from Plastics Color Chip, Inc.

Example 9

(Laminated Film No. 9)

Laminated Film No. 9 was another preferred film for use in the article according to the present invention. Laminated Film No. 9 was made by laminating a first component film, which was a multilayer film, to a second component film, which was a monolayer film containing high density polyethylene (HDPE). Laminated film No. 9 had a total of 5 layers (including one layer of laminating adhesive), exhibited high stiffness (i.e., high modulus), outstanding tear resistance, high gloss, and good printability. Laminated Film No. 9 was especially advantageous for providing a gusseted bag having excellent self-supporting characteristics. The gusseted bag was made by sealing the second component film to itself Laminated Film No. 9 had the structure set forth in Table 9, below.

TABLE 9

| LAYER COMPOSITION | LAYER THICKNESS (mils) |
|---|---|
| First Component Film | |
| blend of 50% LLDPE #1, 20% LLDPE #2, 10% EVA #1, and 15% Slip/Antiblock Masterbatch | 0.45 |
| 100% Polymeric Adhesive | 0.12 |
| blend of 90% EVOH, 10% Nylon 6/Nylon 12 Copolymer | 0.18 |
| 100% Polymeric Adhesive | 0.11 |
| blend of 50% LLDPE #1, 25% LLDPE #2, 25% EVA #1, | 0.24 |
| Laminating Adhesive between First and Second Component Films | |
| Laminating Adhesive | 0.20 |
| Second Substrate | |
| blend of 60% HDPE and 30% White Concentrate | 2.98 |

The various resins and other compositions listed in Table 9 are as identified above in Examples 1–8. Laminated Film No. 9 had a tear strength of about 550 grams.

Table 10, below, provides various physical property data for the various films of Examples 1–9, above.

Example 10

(Comparative)

A commercially-available paper package, in the form of a gusseted bag used in the packaging of 8 pounds bag IAMS® Natural dog food, was obtained and analyzed for various physical property characteristics, which are set forth in the far right-hand column in Table 10, below. The paper package was made from 2 paper layers, an inner adhesive layer, and an inside thermoplastic layer comprising 100% polypropylene. The paper package was believed to have no $O_2$-barrier layer, but was stiff and self-supporting.

TABLE 10

PHYSICAL PROPERTIES OF FILMS OF EXAMPLES ABOVE

| Physical Properties | Ex. 1 | Ex. 2 | Ex. 3 | Ex. 4 | Ex. 5 (Compar.) | Ex. 6 (Compar.) | Ex. 7 (Compar.) | Ex. 8 | Ex. 9 | Ex. 10 (Compar.) |
|---|---|---|---|---|---|---|---|---|---|---|
| Gauge (mils) | 4.31 | 5.8 | 5.83 | 5.76 | 5.90 | 6.11 | 5.01 | 6.53 | 4.51 | 9.40 |
| Volume % Polyolefin, EVA | 91.8 | 91.1 | 93.4 | 93.5 | 79.2 | 71.7 | 78.4 | 96.8 | 91.1 | 6.9 |
| Volume % EVOH, nylon or PET | 4.7 | 4.2 | 3.1 | 3.1 | 15.7 | 25.6 | 19.6 | 0 | 4.2 | 0 |
| Laminating Adhesive (% of total film) | 3.5 | 4.6 | 3.4 | 3.4 | 5.1 | 2.7 | 2 | 3.2 | 4.7 | 1 |
| Tensile strength at break (psi) × 1000 (L) | 10.4 | 10.7 | 8.7 | 7.6 | 10.2 | 5.5 | 6.4 | 9.3 | 5.3 | 10.2** |
| Tensile strength at break (psi) × 1000 (T) | 10.2 | 12.1 | 10.5 | 7.4 | 10.1 | 5.6 | 7.6 | 9.3 | 4.7 | 5.0** |
| % Elongation at break (L) | 180 | 226 | 200 | 101 | 112 | 75 | 120 | 230 | 56 | 2.25** |
| % Elongation at break (T) | 170 | 144 | 180 | 100 | 103 | 38 | 71 | 210 | 58 | 4.35** |
| Modulus, psi × 1000 (L) | 46.4 | 41.3 | 42.9 | 59.4 | 106 | 138 | 128 | 65 | 139 | 900** |
| Modulus, psi × 1000 (T) | 44.5 | 38.2 | 39.6 | 58.8 | 107 | 159 | 147 | 78 | 156 | 380** |
| Impact Strength (ft-lb) | 2.41 | 5.18 | 3.36 | 2.38 | 1.57 | 0.72 | 0.70 | 3.61 | 0.42 | 0.13 |
| Normalized impact strength | 0.56 | 0.89 | 0.57 | 0.41 | 0.27 | 0.12 | 0.14 | 0.55 | 0.09 | 0.01 |
| impact strength (%) compared to Ex. 1 | 100 | 159 | 102 | 73 | 46 | 22 | n/a | 98 | 17 | 2.5 |
| Ball Burst Strength (cm-kg) | 34.4 | n/a | 43.5 | n/a | 22.5 | n/a | 13.1 | n/a | n/a | n/a |
| Normalized Ball burst strength | 7.98 | n/a | 7.46 | n/a | 3.90 | n/a | 2.62 | n/a | n/a | n/a |
| % Compared to Ex. 1 | 100 | n/a | 93 | n/a | 47 | n/a | 32.8 | n/a | n/a | n/a |
| OTR (cc/sq.m-day-atm.) | 2.10 | 3.76 | 1.90 | 20 | 16.8 | 60.40 | 73.3 | n/a | 2 | >200 |

**multiwall paper bag with a polypropylene film liner. The layers are not glued or adhered together. The properties reported are for one layer of paper.
n/a = data not obtained As can be seen from a comparison of the physical properties of the films of Examples 1 and 4 with the films of Comparative Examples 5, 6, and 7, the amount of polyolefin in the films of Examples 1 through 4 was higher than the polyolefin content of the films of Comparative Examples 5, 6, and 7. Moreover, the films of Comparative Examples 5, 6,and 7 contained substantial quantities of polyamide and polyester, which are recognized as being tougher and more impact resistant (and more expensive) than polyolefins, including ethylene/alpha-olefin copolymers. Thus, it would be expected that the films of Comparative Examples 5, 6, and 7 would be tougher and more impact resistant than the films of Examples 1 through 4.

However, it was surprisingly and unexpectedly found that the films of Examples 1 and 4 exhibited equal or superior tensile strength, ball burst strength, and elongation to break relative to the films of Comparative Examples 5 through 7; that the films of Examples 1 through 4 all exhibited impact strength which was superior to the impact strength of the films of Comparative Examples 5 through 7. In the packaging of a relatively hard, flowable product, such as dry pet food, it has been discovered that the films of Examples 1 and 2 exhibited low dimpling levels, and are believed to exhibit a lower dimpling level relative to the films of Comparative Examples 5, 6, and 7.

In addition, the films of Examples 1 through 4 exhibited superior $O_2$-barrier properties, relative to Comparative films as set forth in Examples 5, 6, and 7.

Turning to a comparison of the film of Example 8 with the paper-based packaging material of Comparative Example 10, it is apparent from Table 10 that although the film of Example 8 was substantially thinner than the paper-based package of Comparative Example 10, the film of Example 8 provided, relative to the paper-based package of Comparative Example 10: (i) lower but comparable tensile strength, (ii) higher elongation, and (iii) superior impact strength. Finally, it has been discovered that the multilayer film of Example 8 had an unexpectedly high tear strength (as measured by ASTM D1938-94, hereby incorporated in its entirety, by reference thereto) of about 550 grams.

In the laminated films above which are used to make a gusseted bag in accordance with the present invention, the layer sealed to itself to form the gusseted bag preferably is a layer which does not comprise the slip agent. It has been found that if the layer containing the slip agent is sealed to itself, the resulting seal has a significantly lower seal strength than if a layer free of slip agent is sealed to itself Since Laminated Films Nos. 1, 2, 3, and 9 had slip agent on one of the outer surfaces, but not on the other outer surface, the seals made were fin seals, as opposed to lap seals.

If a lap seal is desired, films such as Laminated Films Nos. 1, 2, 3, and 9 can be used and strong seals can be obtained. That is, if the laminated film is prepared by laminating the first component film to the second component film in an offset position, i.e., leaving a "lip" of the slip-agent-free component film extending from the other component film, a lap seal can be formed of the slip-agent-free film to itself, thereby making a stronger lap seal than would have been possible if the slip-agent-containing layer was present at the lap seal, as illustrated in FIG. 9 and described above.

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

What is claimed is:

1. A sealed article comprising a heat-shrinkable multilayer film which comprises:
   (A) a first film layer which is an inside film layer comprising at least one member selected from the group consisting of ethylene/alpha-olefin copolymer and polystyrene;
   (B) a second film layer comprising at least one member selected from the group consisting of ethylene/ unsaturated ester copolymer, anhydride-modified ethylene/alpha-olefin copolymer, anhydride-modified ethylene/ester copolymer, acid-modified ethylene/ alpha-olefin copolymer, acid-modified ethylene/acid copolymer, and polystyrene;
   (C) a third film layer comprising at least one member selected from the group consisting of ethylene/alpha-olefin copolymer and polystyrene;

(D) a fourth film layer which comprises at least one member selected from the group consisting of ethylene homopolymer, ethylene/alpha-olefin copolymer, ethylene/vinyl alcohol copolymer, polyvinylidene chloride, polyamide, polyester, polyalkylene carbonate, polyacrylonitrile, and ethylene/unsaturated ester copolymer; and wherein at least 85 percent of the film, based on total film volume, consists of at least on member selected from the group consisting of polyolefin homopolymer, polyolefin copolymer, ethylene/ester copolymer, polystyrene, styrene/butadiene copolymer, EVOH, PVDC, and polyacrylonitirile;

wherein the film has a total thickness of at least 2 mils and a tear propagation of 10 to 500 grams per mil, and an impact strength of at least about 1.5 ft-lbs, and a total free shrink, at 180° F., of from about 2 to 50 percent; and wherein the article comprises a seal of the film to at least one member selected from the group consisting of itself and another film.

2. The article according to claim 1, wherein the first and third film layers further comprise ethylene/unsaturated ester copolymer.

3. The article according to claim 1, wherein the seal is a heat seal.

4. The article according to claim 1, comprising a heat seal of the film to itself.

5. The article according to claim 4, wherein:
(a) the first film layer is directly adhered to the second film layer;
(b) the third film layer is directly adhered to the second film layer;
(c) the third film layer is between the second film layer and the fourth film layer; and
(d) the film further comprises an adhesive between the third film layer and the fourth film layer; and
wherein the article comprises a heat seal of the first film layer to itself.

6. The article according to claim 5, wherein the first film layer comprises oriented polymer, the second film layer comprises oriented polymer, and the third film layer comprises oriented polymer, and wherein the multilayer film has a tensile strength at break of at least 4000 psi.

7. The article according to claim 6, wherein each of the oriented polymers is biaxially oriented to a total orientation from about 150 to 250 percent.

8. The article according to claim 6, wherein the fourth film layer comprises oriented polymer, and wherein each if the oriented polymers is biaxially oriented to a total orientation of from about 200 to 500% at a temperature of from about 200 to 280° F.

9. The article according to claim 6, wherein the film comprises a crosslinked polymer network.

10. The article according to claim 6, wherein film has a tear propagation of from about 50 to 800 grams.

11. The article according to claim 8, wherein the fourth film layer comprises at least one member selected from the group consisting of ethylene/alpha-olefin copolymer and ethylene/unsaturated ester copolymer, and the film further comprises a fifth film layer which serves as an $O_2$-barrier layer, the fifth film layer being between the third film layer and the fourth film layer, the fifth film layer comprising at least one member selected from the group consisting of PVDC, EVOH, polyalkylene carbonate, polyacrylonitrile, polyamide, and polyester.

12. The article according to claim 11, wherein the film further comprises:
(a) a sixth film layer which is between the fourth film layer and the fifth film layer, the sixth film layer serving as a first tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer, wherein the sixth layer comprises the adhesive between the third layer and the fourth layer; and
(b) a seventh film layer which is between the third film layer and the fifth film layer, the seventh film layer serving as a second tie layer and comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer.

13. The article according to claim 12, wherein the film further comprises an eighth film layer which is between the third film layer and the seventh film layer, the eighth film layer comprising at least one member selected from the group consisting of ethylene/alpha-olefin copolymer and ethylene/unsaturated ester copolymer.

14. The article according to claim 13, wherein the film further comprises a ninth film layer which comprises a laminating adhesive.

15. The article according to claim 8, wherein the fourth film layer comprises high density polyethylene.

16. The article according to claim 15, wherein the film has an outside surface having a gloss of at least 60 percent.

17. The article according to claim 15, wherein the multilayer film has a modulus of at least about 30,000 psi.

18. The article according to claim 1, wherein the multilayer film has a tear propagation of from about 15 to 200 grams per mil.

19. The article according to claim 1, wherein at least one film layer comprises pigment.

20. The article according to claim 1, wherein trap printing is present between the third layer and the fourth layer.

21. The article according to claim 1, wherein printing is present on an outside surface of the second outer layer.

22. The article according to claim 1, wherein the article is a bag.

23. The article according to claim 22, wherein the article is a member selected from the group consisting of an end-seal bag and a side-seal bag.

24. The article according to claim 22, wherein the bag is a gusseted bag.

25. The article according to claim 1, wherein at least one member selected from the group consisting of the first layer and the second layer comprises polystyrene, and wherein the multilayer film has a modulus of at least about 20,000 psi.

26. A packaged product comprising a heat-shrinkable multilayer film surrounding a product, wherein the film comprises:
(A) a first film layer which is an inside film layer comprising at least one member selected from the group consisting of ethylene/alpha-olefin copolymer and polystyrene;
(B) a second film layer comprising at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, acid-modified ethylene/acid copolymer;

(C) a third film layer comprising at least one member selected from the group consisting of ethylene/alpha-olefin copolymer and polystyrene;

(D) a fourth film layer which is an outside layer comprising at least one member selected from the group consisting of ethylene homopolymer, ethylene/alpha-olefin copolymer, ethylene/vinyl alcohol copolymer, polyvinylidene chloride, polyamide, polyester, polyalkylene carbonate, polyacrylonitrile, and ethylene/unsaturated ester copolymer; and wherein at least 85 percent of the film, based on total film volume, consists of at least on member selected from the group consisting of polyolefin homopolymer, polyolefin copolymer, ethylene/ester copolymer, polystyrene, styrene/butadiene copolymer, EVOH, PVDC, and polyacrylonitirile;

wherein the film has a total thickness of at least 2 mils, and a tear propagation of 10 to 500 grams per mil an impact strength of at least about 1.5 ft-lbs, and a total free shrink, at 180° F., of from about 2 to 50 percent;

wherein the article comprises a heat seal of the film to at least one member selected from the group consisting of itself and another film; and wherein the product comprises hard, flowable, particulates or non-flowable cheese.

27. The packaged product according to claim 26, wherein the product comprises hard, flowable particulates which comprise food.

28. The packaged product according to claim 27, wherein the product comprises at least one member selected from the group consisting of pet food, livestock feed, sugar, coffee, cookies, cereal, cake mix, crackers, chips, and powdered milk.

29. A heat-sealed article comprising a heat-shrinkable multilayer film which comprises:

(A) a first film layer which is an inside film layer comprising at least one member selected from the group consisting of ethylene/alpha-olefin copolymer and polystyrene;

(B) a second film layer which serves as tie layer, and which comprises at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, and acid-modified ethylene/acid copolymer;

(C) a third film layer comprising at least one member selected from the group consisting of polyvinylidene chloride, ethylene/vinyl alcohol copolymer, polyalkylene carbonate, and polyacrylonitrile;

(D) a fourth film layer which serves as tie layer, and which comprises at least one member selected from the group consisting of ethylene/unsaturated ester copolymer, anhydride-modified ethylene/alpha-olefin copolymer, anhydride-modified ethylene/ester copolymer, acid-modified ethylene/alpha-olefin copolymer, acid-modified ethylene/acid copolymer;

(E) a fifth film layer comprising at least one member selected from the group consisting of ethylene/alpha-olefin copolymer and polystyrene; and (F) a sixth layer which comprising at least one member selected from the group consisting of high density ethylene homopolymer, ethylene/alpha-olefin copolymer, propylene homopolymer, polystyrene, styrene/butadiene copolymer, polystyrene, an propylene;

wherein at least 85 percent of the film, based on total film volume, consists of at least one member selected from the group consisting of polyolefin homopolymer, polyolefin copolymer, ethylene/ester copolymer, polystyrene, styrene/butadiene copolymer, EVOH, PVDC, and polyacrylonitirile;

wherein the film has a total thickness of at least 2 mils, an impact strength of at least about 1.5 ft-lbs, and a tear propagation of at least 300 grams per mil, and a total free shrink, at 180° F., of from about 2 to 50 percent; and wherein the article comprises a seal of the film to at least one member selected from the group consisting of itself and another film.

* * * * *